3,303,158
FILM-FORMING NOVOLAK-POLYAZIRIDINE RESIN
Greene W. Strother, Jr., Lake Jackson, Tex., assignor to The Dow Chemical Company, Midland, Mich., a corporation of Delaware
No Drawing. Filed Feb. 24, 1964, Ser. No. 347,018
10 Claims. (Cl. 260—33.4)

This invention relates to resins useful in the preparation of laminates, adhesives, coatings and the like. More particularly, the invention concerns a thermoset resin produced by cross-linking a normally solid thermoplastic novolak resin with a polyaziridine compound.

According to this invention, a normally solid thermoplastic phenol-formaldehyde, i.e. novolak, resin having an average molecular weight in the range from about 370 to about 850 is cured by cross-linking with a polyaziridine compound. The term polyaziridine is used to designate compounds having two or more aziridinyl groups in the molecule rather than polymers of aziridinyl compounds. Both the resin and the curing agent may be dissolved in a volatile solvent such as ethanol to produce a solution suitable for application to various substrates such as textiles, paper, metals and the like. After applying the solution to the substrate, the solvent is evaporated, leaving a dry, non-tacky film of the novolak resin having the polyaziridine dispersed therein. The novolak film protects the polyaziridine from air and moisture which induce its homopolymerization. If stability at a higher temperature than normal room temperature is desired, a partial cure of the novolak to a B stage may be effected by subjecting the dry prepreg to a temperature between 250° and 350° F. for about 2 to 5 minutes. Prepregs which have been partially cured or B staged may be stored for long periods of time, e.g. several weeks or even months, before being laminated and subjected to a final cure.

Unlike the normal method of curing novolak resins by a condensation type of reaction, the resins produced according to this invention are cured by opening the aziridine linkage and reacting the phenolic groups of the novolak with the opened linkage. This type of reaction avoids the production of a reaction by-product such as the water produced in the condensation type of reaction.

The method of preparing coatings, prepregs and laminates with these resins and the properties of these products may be understood by referring to the following examples.

*Example 1*

Seventy grams of a novolak resin having a molecular weight of about 370 was dissolved in ethanol, producing a 47.5 weight percent solution of the resin. This solution was combined with seven grams of tris(1-aziridinyl)phosphine oxide, which was dissolved in sufficient ethanol to produce a 71 weight percent solution. This mixture provided 0.26 equivalent of the aziridine compound per equivalent of the novolak resin. A cotton linter paper 10 mils thick was coated with this resin solution then dried for 10 minutes at 80° C. and for 2 hours at 95° C., producing a dry, non-tacky prepreg. A 6-ply laminate was prepared from the prepreg by heating for 30 minutes at 150° C. and 800 lbs./sq./in. pressure. The cured laminate had a Shore D hardness of 94, flexural strength of 16,170 lbs./sq./in. at 25° C., Izod impact of 0.43 ft.-lbs. and a water resistance of 0.3 percent weight gain in 24 hours.

*Example 2*

A solution was prepared consisting of 400 grams of novolak resin having an average molecular weight of about 370 (66.4 percent solids in ethanol) and 205 grams tris(1-aziridinyl)phosphine oxide (73 percent solids in ethanol). This solution was thinned by the addition of ethanol until a viscosity of 55 centipoise was obtained. This material was then coated on glass cloth and dried at 100° C. for two hours and 25 minutes. The cloth was then cut into 10 in./x/12 in. pieces and 12 such pieces were laminated to form a 12-ply laminate. The laminates were first B-staged in a press with constant pressure for 3.5 minutes at 300° F. The 12-ply laminate was finally completed by heating for 60 minutes at 300° F. and 300 lbs./sq. in. The cured laminate had the following properties: Barcol Hardness of 84, ASTM D-635 Flame Test 21–0 seconds, water resistance of 0.178 percent weight gain in 24 hours, compressive strength at room temperature of 56,000 lbs./sq. in. and flexural strength in lbs./sq. in. of 79,100 at room temperature, 77,900 after being boiled in water for two hours, 73,300 at 160° F. and 55,900 at 300° F.

*Example 3*

A solution was prepared consisting of 300 grams of novolak resin having an average molecular weight of about 370 (66.4 percent solids in ethanol), 40 grams of tetrabromo 2,2-bis(4-hydroxyphenyl)propane and 165.7 grams tris(1-aziridinyl)phosphine oxide (73 percent solids in ethanol). This mixture was thoroughly stirred and additional alcohol was added until the viscosity reached 56.0 centipoise at 25° C. This was coated on glass cloth and dried in an oven at 100° C. for 1.5 hours. At the end of this time the impregnated cloth was cut into 10 in. x 12 in. sheets and stacked 12 deep to form a 12-ply laminate then B-staged for 2 minutes at 200° F. and finally completely cured by heating for one hour at 300° F. and 300 lbs./sq. in. The laminated product had the following properties: Barcol hardness of 83; ASTM D-635 flame test of 7.5–0 seconds; water resistance of 0.185 percent weight gain in 24 hours and flexural strength in lbs./sq. in. at the following conditions: 92,700 at room temperature; 82,200 at 160° F.; 58,500 at 300° F. and 86,600 after being boiled in water for two hours.

*Example 4*

A 60 percent solution of a novolak resin having an average molecular weight of about 510 was combined with 0.86 equivalent of bis(1-aziridinyl)phosphinic acid: diethylene glycol ester. A film of the mixture was spread on a Bonderized steel plate and dried first at room temperature for 30 minutes then at 100° C. for 30 minutes. It was then cured at 150° C. for one hour. The clear hard film which was produced was resistant to acetone, ethylene dichloride, toluene and water. After exposure to these various fluids for 30 minutes at room temperature, the excellent metal adhesion was evident by the Gardner impact of 14 in.-lbs. on the front and 2 in.-lbs. on the back and the Mandrel bend of 1.5 in. diameter bar.

Example 5

A 60 percent solution of a novolak resin having an average molecular weight of about 510 was combined with an equivalent amount of bis(1-aziridinyl)phosphinic acid: polypropylene glycol ester. The polypropylene glycol had an average molecular weight of about 250. A film of the solution was applied to a Bonderized steel plate and dried at ambient temperature for 30 minutes, then at 100° C. for an additional 30 minutes. After further curing at 150° C. for one hour a hard clear film was produced which was resistant to acetone, ethylene dichloride, toluene, and water after a 30 minute exposure at ambient temperature. The Gardner impact and mandrel bend of this film was equal to that obtained in Example 4.

Example 6

A prepreg was prepared by coating glass cloth with a solution containing 87.2 parts by weight of a novolak resin having an average molecular weight of 810, 71 parts of tris(1-aziridinyl)phosphine oxide (75 percent solids in ethanol), 17.5 parts tetrabromo 2,2-bis(4-hydroxyphenyl)propane, 26 parts ethanol and 173 parts isopropanol. The cloth was dried for 12.5 minutes at 110° C. then cut into sheets 10 in. x 12 in. Twelve of these sheets were stacked into a 12-ply layer and heated at 300° F. for one minute to develop a B stage then cured for one hour at 300° F. and 300 lbs./sq. in. This laminate had a Barcol hardness of 84, ASTM D-635 flame test of 5-0 seconds, water absorption of 0.10 percent weight gain in 24 hours and flexural strengths in lbs./sq. in. at the following conditions: 80,600 at room temperature; 54,000 at 300° F. and 83,200 after being boiled in water for two hours.

Novolak resins having an average molecular weight between about 370 and 850 are suitable for use according to this invention. Resins in this molecular weight range are soluble in easily vaporized alcohols such as ethanol and isopropanol and the resins produce a dry, non-tacky film on the substrate when solvent is removed. As illustrated in Examples 4 and 5, these resins have excellent adhesive properties with metal surfaces and produce extremely tough films. Where flexibility is desired in the film the novolaks having a molecular weight between about 370 and 510 are preferred. The higher molecular weight novolaks tend to produce extremely hard resins with little flexibility. The flame retardant properties of these resins can be enhanced by the addition of halogenated phenols such as tetrabromo 2,2-bis(4-hydroxyphenyl)propane which is also cross-linked by the polyaziridine. Quantities of the halogenated compound ranging from about 10 to as high as 75 percent of the weight of the novolak may be used.

The polyaziridinyl compounds which are suitable for cross-linking the thermoplastic novolak resin are the bis- and tris(aziridinyl)phosphine oxides and sulfides as well as the diesters of bis-(1-aziridinyl)phosphinic acid and a polyhydric aliphatic alcohol such as diethylene glycol, and the like. Additionally the bis- and tris(1-aziridinyl) triazines such as 2,4-bis(1-aziridinyl)-6-dimethylamino-Sym.-triazine and tris-2,4,6-(1-aziridinyl)-Sym.-triazine are suitable. In general, all of the polyaziridines are reactive with the phenolic groups of the novolak resins. The principal characteristic is that the mixture of the polyaziridine and novolak provide a solid residue at normal ambient temperatures prior to cross-linking.

The quantity of the polyaziridine compound which is used in curing the novolak may vary from about 25 to 125 percent of the stoichiometric amount which will react with the novolak resin. Excess polyaziridines may be used without an adverse effect on the properties of the cured resin; however, it generally is uneconomic owing to the greater cost of this material compared with that of the novolak.

Low molecular weight alcohols, ethers and ketones such as methanol, ethanol, isopropanol, tetrahydrofuran, acetone, and methyl ethyl ketone are particularly suitable solvents for these resin mixtures owing to their high volatility. The quantity of solvent used is that which produces a satisfactory fluidity for the particular use to be made of the resin.

I claim:

1. A film-forming thermosettable mixture consisting essentially of a novolak resin having an average molecular weight between about 370 and 850, a polyaziridine compound selected from the group consisting of bis- and tris(aziridinyl)phosphine oxides and sulfides, the diesters of bis-(1-aziridinyl)phosphinic acid and a polyhydric alcohol, and the bis- and tris-(1-aziridinyl)triazines and a volatile solvent for said novolak resin and polyaziridine compound, the quantity of said polyaziridine compound being from about 25 to about 125 percent of the stoichiometric amount which will react with said novolak resin.

2. A film-forming thermosettable mixture according to claim 1 wherein polyaziridine is tris(1-aziridinyl)phosphine oxide.

3. A film-forming thermosettable mixture according to claim 1 wherein said polyaziridine is a diester of a polyhydric alcohol and bis(1-aziridinyl)phosphinic acid.

4. A solution of a film-forming thermosettable mixture consisting essentially of a novolak resin having an average molecular weight of about 510 and bis(1-aziridinyl) phosphinic acid: diethylene glycol ester and a fluidizing amount of ethanol, said solution containing between about 0.25 and 1.25 aziridine equivalents in said phosphinic acid ester per hydroxyl equivalent in said novolak.

5. A dry, non-tacky prepreg produced by impregnating a substrate with a solution of (1) a thermoplastic novolak having a molecular weight in the range from about 370 to about 850 and (2) a polyaziridine compound selected from the group consisting of bis- and tris(aziridinyl)-phosphine oxides and sulfides, the diesters of bis-(1-aziridinyl)phosphinic acid and polyhydric alcohol, and the bis- and tris(1-aziridinyl)triazines, the quantity of said polyaziridine compound being between about 25 and 100 percent of the stoichiometric amount which will react with said novolak, then evaporating solvent therefrom, producing said dry, non-tacky prepreg.

6. A dry, non-tacky prepreg produced according to claim 5 wherein said polyaziridine compound is tris(1-aziridinyl)phosphine oxide.

7. A dry, non-tacky prepreg produced according to claim 5 wherein said polyaziridine compound is bis (1-aziridinyl)phosphinic acid.

8. A flame retardant film-forming thermosettable mixture consisting essentially of a novolak resin having an average molecular weight between about 370 and 850, tetrabromo 2,2-bis(4-hydroxyphenyl)propane, a polyaziridine compound selected from the group consisting of bis- and tris(aziridinyl)phosphine oxides and sulfides, the diesters of bis-(1-aziridinyl)phosphinic acid and a polyhydric alcohol, and the bis-and tris(1-aziridinyl)triazines, and a volatile solvent for said mixture, the quantity of said tetrabromo 2,2-bis(4-hydroxyphenyl)propane being from about 10 to about 75 weight percent of said novolak and the quantity of said polyaziridine compound being from about 25 to about 125 percent of the stoichiometric amount which will react with phenolic hydroxyl groups in said novolak and tetrabromo 2,2-bis(4-hydroxyphenyl) propane.

9. A B-stage prepreg comprising a substrate impregnated with a thermosettable mixture consisting essentially of: (1) a novolak resin having an average molecular weight between about 370 and 850; and (2) a polyaziridine compound selected from the group consisting of bis- and tris(aziridinyl)phosphine oxides and sulfides, the diesters of bis-(1-aziridinyl)phosphinic acid and a polyhydric alcohol, and the bis- and tris(1-aziridinyl)triazines, the quantity of said polyaziridine compound being from about 25 to about 125 percent of the stoichiometric amount which will react with said novolak resin; said thermosettable mixture being partially cured by subjecting the impregnated substrate to a temperature in the range from about 250 to about 350° F. for about 2 to 5 minutes.

10. A B-stage prepreg according to claim 9 wherein said polyaziridine compound is tris(1-aziridinyl)phosphine oxide.

References Cited by the Examiner
UNITED STATES PATENTS 2,582,704  1/1952  Kropa et al. _____ 260—838
2,915,480  12/1959  Reeves et al. _____ 260—33.4
3,119,782  1/1964  Fram _____ 260—33.4

OTHER REFERENCES

Gould: Phenolic Resins, Reinhold Plastics Applications Series, 1959, pages 108, 109, 11.

MORRIS LIEBMAN, *Primary Examiner.*
L. T. JACOBS, *Assistant Examiner.*